(12) United States Patent
Shimazaki

(10) Patent No.: US 6,840,209 B2
(45) Date of Patent: Jan. 11, 2005

(54) DIRECT INJECTION DIESEL ENGINE

(75) Inventor: Naoki Shimazaki, Fujisawa (JP)

(73) Assignee: Isuzu Motors Limited, Tokyo (JP)

(\*) Notice: Subject to any disclaimer, the term of this patent is extended or adjusted under 35 U.S.C. 154(b) by 134 days.

(21) Appl. No.: 10/229,468

(22) Filed: Aug. 28, 2002

(65) Prior Publication Data

US 2003/0047159 A1 Mar. 13, 2003

(30) Foreign Application Priority Data

Sep. 7, 2001 (JP) ......................................... 2001-272141

(51) Int. Cl.$^7$ ................................................. F02B 3/08
(52) U.S. Cl. ......................................... 123/276; 123/305
(58) Field of Search .................................. 123/276, 305

(56) References Cited

U.S. PATENT DOCUMENTS

| | | | | |
|---|---|---|---|---|
| 4,286,557 A | * | 9/1981 | Klomp | 123/298 |
| 5,868,112 A | * | 2/1999 | Mahakul et al. | 123/263 |
| 5,875,743 A | | 3/1999 | Dickey | 123/25 |
| 6,463,907 B1 | * | 10/2002 | Hiltner | 123/304 |
| 6,513,487 B1 | | 2/2003 | Jorach et al. | 123/299 |
| 6,561,157 B2 | * | 5/2003 | zur Loye et al. | 123/295 |
| 2002/0078918 A1 | * | 6/2002 | Ancimer et al. | 123/295 |
| 2002/0157619 A1 | * | 10/2002 | Gray | 123/1 A |
| 2003/0041836 A1 | * | 3/2003 | Roberts, Jr. | 123/276 |
| 2003/0226538 A1 | * | 12/2003 | Eckerle et al. | 123/298 |
| 2003/0233996 A1 | * | 12/2003 | Marriott et al. | 123/295 |

FOREIGN PATENT DOCUMENTS

| | | |
|---|---|---|
| DE | 199 16 485 A1 | 10/2000 |
| EP | 0 849 448 A1 | 6/1998 |
| EP | 1 031 722 A2 | 8/2000 |
| EP | 1 217 186 A2 | 6/2002 |

OTHER PUBLICATIONS

Copy of EP Search Report Application Ser. No. EP 02 01 9671 dated Sep. 22, 2003.

\* cited by examiner

Primary Examiner—Erick Solis
(74) Attorney, Agent, or Firm—McCormick, Paulding & Huber LLP

(57) ABSTRACT

Cleaning of exhaust gas and reduction of fuel costs are aimed at while realizing homogenious charge (or pre-mixing) compression ignition combustion and performing fuel injection in a suitable manner in all regions of engine operation. In a direct injection diesel engine there are provided an conventional injection mode in which fuel is injected with a timing (I) in the vicinity of the compression top dead center of piston (1) and a homogenious charge compression injection mode in which fuel is injected with a timing (II to V) which is earlier than that in the conventional injection mode, and such that fuel ignition does not occur at least until injection has been completed, fuel injection being performed by the conventional injection mode during full load operation of the engine and fuel injection being performed by the homogenious charge compression injection mode during part (low/medium) load operation of the engine. Ordinary diffusion combustion is realized when operating the engine under full load yet while receiving the benefit of amelioration of exhaust gas etc due to homogenious charge compression ignition combustion; thus, suitable fuel injection can be implemented over the entire operating range.

13 Claims, 1 Drawing Sheet

DIRECT INJECTION DIESEL ENGINE

CROSS REFERENCES TO RELATED APPLICATIONS

This application is entitled to the benefit of and incorporates by reference essential subject matter disclosed in Japanese Patent Application No. 2001-272141 filed Sep. 7, 2001.

BACKGROUND OF THE INVENTION

1. Field of the Invention

The present invention relates to a direct injection diesel engine and in particular relates to a direct injection diesel engine wherein the cleaning of exhaust gas and improvement in fuel consumption are effected by performing homogenious charge compression ignition combustion.

2. Description of the Related Art

In recent years, demands for environmental measures relating to internal combustion engines, in particular diesel engines, have become increasingly strong and various means such as diesel particulate filters (DPF) that capture soot such as black smoke or NOx catalysts that effect cleaning by reducing NOx are being provided. In addition, various combustion systems are being studied in order to respond to demands for lowering fuel consumption with the aim of basically eliminating black smoke or NOx and, in addition, lowering $CO_2$.

However, DPF or NOx catalysts of the continuous regeneration type, which have recently been attracting attention, are restricted in regard to the temperature at which they function effectively; in particular, they have problems such as not functioning effectively in the region of low/medium engine load, where the temperature of the engine exhaust gas is low. Also, in the case of the above DPF or catalysts, when the reducing agent HC is added from the fuel, this is accompanied by a deterioration of fuel consumption.

In view of the above, it is preferable from the technical standpoint to improve combustion itself.

One way of doing this which has recently attracted attention is homogenious charge (or pre-mixing) combustion, in which ignition is effected after pre-mixing the fuel within the combustion chamber by altering the fuel injection timing from the normal timing to make use of the time from the start of fuel injection up to ignition. It is known that low NOx and low smoke can be achieved by such homogenious charge combustion.

Known ways of achieving homogenious charge combustion include early injection of fuel relative to the fuel injection timing in the case where ordinary diffusion combustion is performed (typically, BTDC 10° to ATDC 10°) and the achievement of homogenious charge combustion by prolonging the ignition lag period by retarding the timing.

However, retarding the fuel injection timing always results in a timing wherein the combustion period departs from the top dead center such that deterioration of thermal efficiency is difficult to avoid, and it is therefore undesirable since this is accompanied by deterioration of fuel consumption. Early fuel injection is therefore considered preferable, since the combustion period can be set in the vicinity of the top dead center so as not to be accompanied by deterioration of fuel consumption.

However, homogenious charge combustion in which fuel is injected earlier than usual (this is called homogenious charge (or pre-mixing) compression ignition combustion) is subject to the following problems.

First of all, homogenious charge compression ignition combustion cannot be performed in all operating regions of the engine. This is because higher rates of fuel injection under full load result in ignition starting before the engine reaches the vicinity of the top dead center, resulting in severe knocking, which damages the engine. Another reason is that even if ignition starts in the vicinity of the top dead center, subsequent combustion proceeds all at once, resulting in a rise in combustion temperature and increased NOx.

Next, in homogenious charge compression ignition combustion, since the fuel is injected when the piston is lower than normal, if the injection angle is not correctly set, the fuel that is injected sticks to the inside wall of the cylinder, tending to cause an increase in unburnt HC and/or oil dilution, which tends to result in a deterioration in fuel consumption.

SUMMARY OF THE INVENTION

The present invention was made in view of the above problems, its object being the implementation of suitable fuel injection in all engine operating regions, cleaning of exhaust gas and reduction in fuel consumption, while implementing homogenious charge compression ignition combustion.

According to the present invention, in a direct injection diesel engine comprising a combustion chamber defined by a cylinder, cylinder head and piston, a cavity formed as a recess in the piston defining and forming part of the combustion chamber, and a fuel-injection nozzle that injects fuel into the combustion chamber, and in which there are provided an conventional injection mode in which fuel is injected from the fuel injection nozzle with a timing in the vicinity of the compression top dead center of the piston, and a homogenious charge compression injection mode in which fuel is injected from the fuel injection nozzle with a timing that is earlier than that in the conventional injection mode and such that fuel ignition does not occur at least until injection has been completed, fuel injection is performed by the conventional injection mode during full load operation of the engine and fuel injection is performed by the homogenious charge compression injection mode during part (low/medium) load operation of the engine.

In this way, during part load operation of the engine, fuel injection is performed with the homogenious charge compression injection mode, achieving homogenious charge compression ignition combustion and making it possible to obtain benefits such as an amelioration of [the amount of] exhaust gas and, in addition, during operation of the engine under a full load, fuel injection is performed with the conventional fuel injection mode, so conventional diffusion combustion is achieved; as a result appropriate fuel injection can be performed over the entire range of engine operation regions.

Preferably, an excess air ratio $\lambda$ of less than 2.5 is identified as full load operation, and fuel injection is performed in the conventional injection mode in this case, and an excess air ratio $\lambda$ of at least 2.5 is identified as part load operation, and fuel injection is performed in the homogenious charge compression injection mode in this case.

Also preferably the injection angle of the fuel injection nozzle with respect to the nozzle axis is a fixed angle such that in the conventional injection mode fuel reaches the inside wall of the cavity on the outside in the radial direction from the lowermost position of the cavity, and in the homogenious charge compression injection mode fuel reaches at least the inside wall of the cavity.

In this way, since the fuel is injected in the radially outer direction from the lowermost position of the cavity in the conventional injection mode, fuel can be injected into the interior of the cavity both in the conventional injection mode and in the homogenious charge compression injection mode, making it possible to prevent fuel from adhering to the side wall within the cylinder in the homogenious charge compression injection mode and also preventing fuel accumulation in the vicinity of this lowermost position. Thereby, discharge of unburnt HC can be prevented.

Preferably the injection angle is less than 67.5°.

Also preferably the timing of commencement of fuel injection in the homogenious charge compression injection mode is subsequent to 50° before compression top dead center and prior to 20°.

Preferably a protrusion is formed in the middle of the bottom wall of the cavity, the sidewall of the cavity being constituted with a face such that throttling is not formed at the cavity inlet.

DESCRIPTION OF THE PREFERRED EMBODIMENTS

Figure 1:
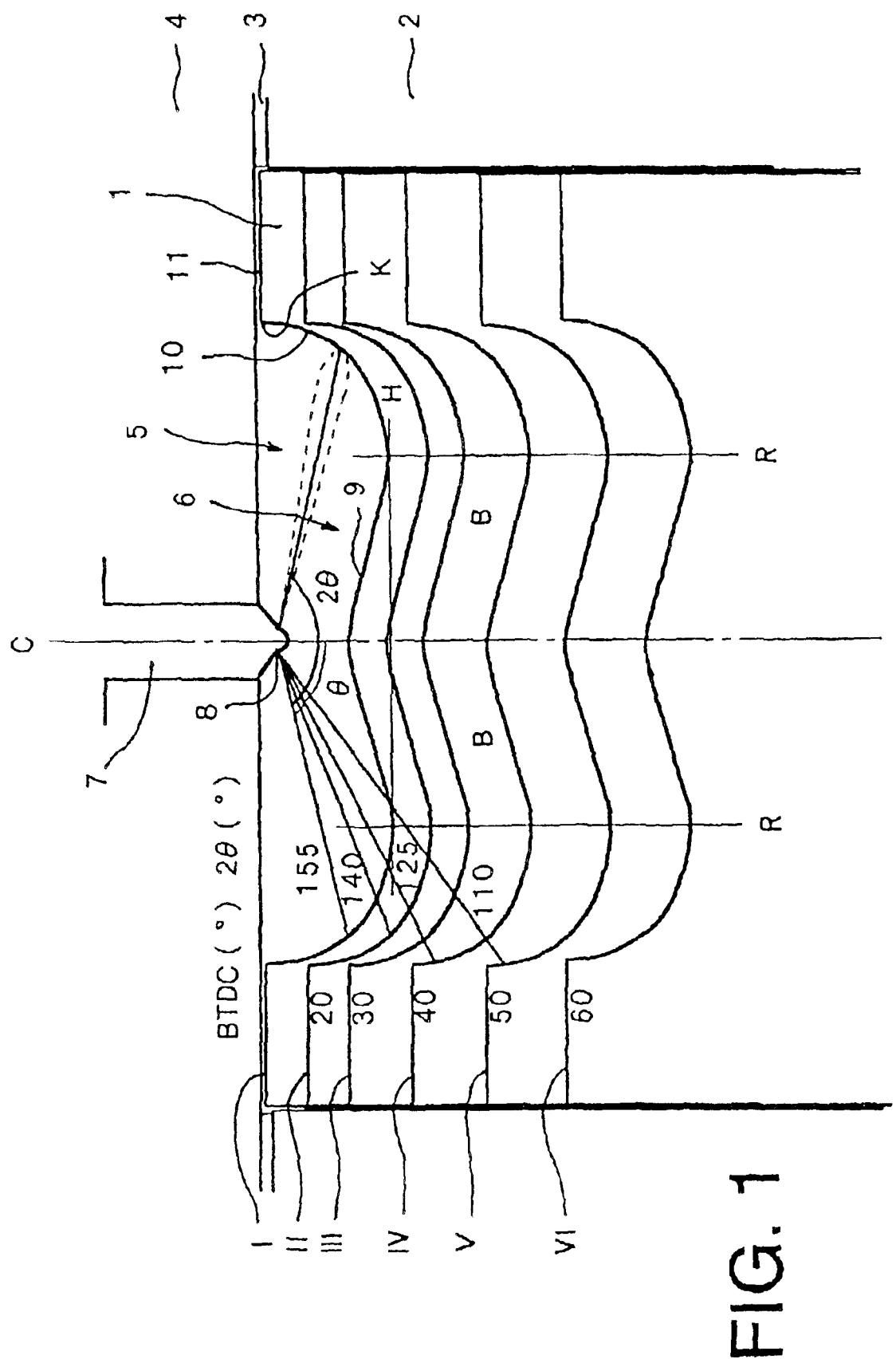
FIG. 1 is a cross sectional view illustrating the interior of an engine according to an embodiment of the present invention.

A preferred embodiment of the present invention is described below with reference to the accompanying drawings.

FIG. 1 is a cross sectional view showing the interior of a direct injection diesel engine according to this embodiment. As shown in the Figure, a cylinder head 4 is mounted with the aid of a gasket 3 at the top of a cylinder 2, piston 1 being provided so as to be free to reciprocate vertically within cylinder 2. A combustion chamber 5 is defined by this piston 1, cylinder 2 and cylinder head 4. A cavity 6 is provided at the top of piston 1; cavity 6 defines part of combustion chamber 5. A fuel-injection nozzle 7 for injecting fuel into combustion chamber 5 is provided in cylinder head 4. The tip of fuel-injection nozzle 7 projects into the interior of the combustion chamber 5 and a plurality of jets 8 are provided at its tip.

The axes of piston 1, cylinder 2, fuel-injection nozzle 7 and cavity 6 are arranged on the same axis C. These are therefore all arranged coaxially. The jets 8 of fuel injection nozzle 7 are arranged at equal intervals in the circumferential direction in positions at the same height on this axis C, being directed so as to inject fuel with a prescribed injection angle θ with respect to axis C, respectively. In the Figure, the angle (opening angle) which is made by corresponding injection axes represented symmetrically about axis C is shown as 2θ; the half value θ thereof is the injection angle of fuel injection. Cavity 6 has a symmetric shape with respect to axis C.

In this case, the engine could be a diesel engine of the injection pump type comprising an electronic governor, in which the fuel-injection rate and injection period etc of the engine are electronically controlled in accordance with the engine operating condition, but is preferably a common rail type diesel engine, since this offers a greater degree of freedom in respect of the injection period. In the case of the common rail type, fuel-injection nozzle 7 can be an injector comprising an electronic actuator (electromagnetic solenoid etc). Engine operating condition detection means are provided for detecting engine operating condition such as engine speed and engine load; this includes at least intake rate detection means (airflow sensor etc) for detecting the rate of engine air intake. In addition, an electronic control unit is provided that calculates and determines the target fuel injection rate and injection period etc from these detected engine operating conditions and effects fuel injection corresponding to this target value.

Cavity 6 constitutes a so-called toroidal combustion chamber shaped as a shallow dish, having a shape with a surface area that is as small as possible. A gently rising protrusion 9 is formed in the middle of the bottom wall in the combustion chamber, where the air utilization rate is low. Also, the sidewall 10 of cavity 6 is constituted solely by surfaces such that no throttling of the cavity inlet is formed. That is, all surfaces of the side wall 10 either diverge from the axis C in the upwards direction or are parallel with axis C, so that no surface exists that approaches axis C in the upwards direction. In other words, only surfaces that open upwards or run vertically are present; there are no surfaces that open downwardly. Thus, cavity 6 does not constitute a so-called re-entrant combustion chamber having a lip.

A plurality of piston positions are shown in the Figure. The highest one of these (I) that is shown is a position in the vicinity of the compression top dead center; this is a position contained between 10° before the compression top dead center (BTDC) and 10° after the compression top dead center (ATDC). The positions following this, moving downwards, are BTDC 20° (II), 30° (III), 40° (IV), 50° (V) and 60° (VI).

Also, a plurality of injection angles are shown in the Figure; taken in order respectively from the top, these are θ=77.5°, 70°, 62.5°, and 55°. Expressed in terms of 2θ, these are 2θ=155°, 140°, 125° and 110°.

Next, the engine of this embodiment is provided with two fuel-injection modes, namely, an conventional injection mode and a homogenious charge compression injection mode.

The conventional injection mode is a mode in which fuel is injected from fuel-injection nozzle 7 with a timing in the vicinity of the compression top dead center of the piston and is a mode in which fuel injection is performed with the same timing as in the case of an ordinary engine. Specifically, injection of fuel is commenced at some time between BTDC 10° and ATDC 10°. As well as a single injection in which all of the injection amount is injected at a single injection, this conventional injection mode may include double injection, in which a pilot injection of small quantity is performed before the main injection, in which the remaining amount is injected. In the case of double injection, the starting time of the later i.e. the main injection is between BTDC 10° and ATDC 10°. Thus, for example in the case of single injection, the combustion mode adopted is a diffusion combustion mode, in which the fuel that was injected in the initial period of fuel-injection ignites after an ignition lag time and by continued injection of fuel into the flame which is thereby produced, this fuel is burnt.

However, in the case of diffusion combustion, since fuel newly injected into the flame is burnt, the fuel must be burnt by supplying it into a region where there is originally little oxygen, and therefore smoke tends to be produced. This may therefore be combined with a homogenious charge compression injection mode, as follows.

The homogenious charge compression injection mode is a mode in which fuel is injected from fuel-injection nozzle 7 with a timing earlier than the conventional injection mode and in which fuel ignition will not occur at least until injection has terminated. More specifically, fuel injection is commenced at a timing between BTDC 50° and 20°. This timing is a timing such that fuel ignition commences after completion of fuel injection. In the same way as described above, the homogenious charge compression injection mode includes double injection, in which a pilot injection is performed, in addition to single injection. In the case of double injection, the starting time of the main injection is between BTDC 50° and 20°. For example, the combustion mode which is adopted in the case of single injection is a homogenious charge compression injection mode, in which fuel is injected in a condition in which the temperature and pressure within the cylinder are not yet sufficiently high, so that the ignition lag period is increased and premixed vapor is formed by thorough stirring and mixing of the fuel and the air within combustion chamber 5 and, after completion of fuel injection, the premixed vapor that has been diffused substantially throughout all the regions within combustion chamber 5 with the rise in pressure and temperature within the cylinder is ignited, producing combustion. Since combustion occurs after all of the fuel has mixed with air and has been uniformly diluted within the combustion chamber, the combustion takes place with the fuel being surrounded by a generous amount of oxygen, so smoke can be prevented, the rate of combustion is comparatively gentle, and the combustion temperature does not rise abruptly so that production of NOx can be prevented.

However, as described above, in the case of operation of the engine under full load, the problem of knocking etc occurs, making it impossible to implement the homogenious charge compression injection mode (homogenious charge compression ignition combustion).

Accordingly, in this embodiment, fuel injection is performed in the same way as ordinarily by the normal injection mode when operating under full load but when operating under part (low/medium) load i.e. at lower load than this, fuel injection is performed by the homogenious charge compression injection mode. In this way, homogenious charge compression ignition combustion, which is advantageous for cleansing exhaust gas, can be utilized while appropriate fuel injection is performed in all operating regions.

It is possible to make the decision regarding the mode changeover timing or which mode is to be employed by reference to the magnitude of the rate of fuel injection but, in this embodiment, the decision is made by reference to the magnitude of the rate of excess air. It has been found by experiment that the occurrence of diesel knocking in homogenious charge combustion is largely dependent on the ratio of excess air $\lambda$; it has been confirmed that severe diesel knocking occurs at a ratio of excess air $\lambda$=less than 2.5. The case where the excess air rate $\lambda$ is less than a prescribed value, in this embodiment, 2.5, is therefore identified as full load operation and fuel injection is then performed in the conventional injection mode. In contrast, the case where the excess air ratio $\lambda$ is 2.5 or more is identified as part (low/medium) load operation, and fuel injection is performed in the homogenious charge compression injection mode.

More specifically, the electronic control unit calculates the excess air ratio $\lambda$ from the actual air intake rate detected by intake rate detection means and the target fuel injection rate, and if $\lambda<2.5$, performs fuel injection in accordance with the conventional injection mode, and if $\lambda\geq2.5$ performs fuel injection in accordance with the homogenious charge compression injection mode.

In this embodiment, two modes are implemented using a single fuel injection nozzle 7 having fixed jets 8. If therefore the injection angle $\theta$ of the fuel injection nozzle 7 is made too large with respect to the conventional injection mode (i.e. the opening angle $2\theta$ is widened), as the piston is lower in the homogenious charge compression injection mode, the fuel mist does not enter the cavity 6 but collides with the inside wall of cylinder 2, tending to increase unburnt HC and/or dilute the oil. Also, if the injection angle $\theta$ is made too small with respect to the homogenious charge compression injection mode (i.e. the opening angle $2\theta$ is narrowed), when in the conventional injection mode, the fuel mist collides with the bottom of cavity 6 and accumulates in cavity 6, tending to increase unburnt HC etc. For this reason, in order for the two modes to co-exist, the injection angle $\theta$ of the fuel-injection nozzle 7 is set as below.

Specifically, the injection angle $\theta$ is set at a fixed angle such that in the conventional injection mode the fuel reaches the inside wall of the cavity on the radially outer side from the lowermost position of cavity 6 and, in the homogenious charge compression injection mode, the fuel reaches at least the inside wall of the cavity.

The lowermost position of cavity 6 is the position or point where cavity 6 is deepest and is the position B where the position of height H and the radial position R intersect in the drawing. This lowermost position B appears as a circle that makes one circuit around axis C. The limit on the small side of $\theta$ in the conventional injection mode is lowermost position B and the limit on the large side of $\theta$ is the position of intersection K where the side wall 10 of cavity 6 and piston crown 11 intersect. The injection angle $\theta$ is set such that, in the conventional injection mode, fuel cannot arrive at or collide with the cavity inside wall between this lowermost position B and intersection position K.

Also, in the homogenious charge compression injection mode, the fuel may reach the inside wall of the cavity, the essential point being that the fuel should be capable of entering cavity 6. The only limit of $\theta$ is therefore intersection position K on the large side, but there is no limit of $\theta$ on the small side. The reason why this is possible is that, in this mode, fuel is injected earlier than normal, so the ignition lag time is increased, with the result that meanwhile all of the fuel can mix with air, so the problem of unburnt HC does not arise.

The relationship between injection angle $\theta$ (or angle of opening $2\theta$) and the injection timing will next be described using the Figure. First of all, let us assume that fuel injection is performed in the conventional injection mode when piston 2 is in the uppermost position shown,. Also, in the homogenious charge compression injection mode, let us assume that fuel injection is performed when piston 2 is in an illustrated position BTDC 20°, 30°, 40° or 50°. Position BTDC 60° is also shown, but this is depicted only for reference.

Injection angle $\theta=77.5°$ ($2\theta=155°$) which is the uppermost position shown is a typical value that can be adopted for an ordinary engine. In this case, the above condition is of course satisfied in the case of the conventional injection mode and the above condition is satisfied even in the homogenious charge compression injection mode if the injection commencement timing is BTDC 20° or 30°. However, in the case of BTDC 40° and 50°, this condition is not satisfied; therefore, in the case where the injection commencement timing of the homogenious charge compression injection mode is BTDC 20° or 30°, an injection angle $\theta=77.5°$ ($2\theta=155°$) may be adopted.

$\theta=70°$ ($2\theta=140°$) also satisfies the above condition of the conventional injection mode. If, in the homogenious charge compression injection mode, the injection commencement timing is BTDC 20° or 30°, the above condition is satisfied, but in the case of BTDC 40° and 50°, the above condition is not satisfied. Consequently, if the injection commencement timing of the homogenious charge compression injection mode is BTDC 20° or 30°, injection angle θ=70° (2θ=140°) may be adopted.

If θ=62.5° (2θ=125°), the above condition of the conventional injection mode is also satisfied. If, in the homogenious charge compression injection mode, the injection commencement timing is BTDC 20°, 30° or 40°, the above condition is satisfied, but when the timing is BTDC 50°, the above condition is not satisfied. Consequently, if the injection commencement timing in the homogenious charge compression injection mode is BTDC 20°, 30° or 40°, an injection angle θ=62.5° (2θ=125°) may be adopted.

θ=55° (2θ=110°) does not satisfy the above condition of the conventional injection mode. In this case, the above condition is satisfied for any injection commencement timing (BTDC 20°, 30°, 40° or 50°) of the homogenious charge compression injection mode. However, the above condition is not satisfied in the conventional injection mode. An injection angle θ=55° (2θ=110°) can therefore not be adopted.

Thus, in the determination of injection angle θ, the diameter and/or depth of cavity 6 are related to the injection commencement timing of the homogenious charge compression injection mode in particular, but, whatever the case, by selecting an angle such as to satisfy the above condition, discharge of unburnt HC in the conventional injection mode and/or collision etc of fuel mist with the side wall within cylinder 2 in the homogenious charge compression injection mode can be prevented. In the case of the conventional injection mode, by injecting fuel such that the fuel arrives at the inside wall of the cavity on the outside in the radial direction with respect to the lowermost position of cavity 6, the fuel after colliding with the inside wall of the cavity can be made to flow in the radially outward direction along the inner wall of the cavity, thereby becoming diffused and so making it possible to utilize air over a wider range; thus desirable combustion can be achieved.

However, it is desirable for combustion to occur in a position as remote as possible from the undersurface of cylinder head 4. The reason for this is that a water jacket is formed in the interior of cylinder head 4 so that cylinder head 4 is cooled by cooling water; consequently, if combustion occurs in the vicinity of the undersurface of the cylinder head, heat is abstracted by cylinder head 4, causing thermal efficiency to be lowered, which is disadvantageous in regard to fuel consumption and causes black smoke to be generated.

From this standpoint it is therefore desirable that the injection angle θ be as small as possible. It has been discovered by experiment that if the injection angle θ is equal to or less than 67.5° (2θ=135°), fuel consumption is improved and black smoke is suppressed. It is therefore preferable that the injection angle θ be equal to or less than 67.5°.

Furthermore, in this embodiment, thermal efficiency and the fuel consumption are improved by making it more difficult for heat to be abstracted by piston 2, by employing a cavity shape with a surface area which is as small as possible. Also, since combustion in cavity 6 occurs chiefly on the outside, so that the rate of utilization of air in the middle of the cavity is low, protrusion 9 is formed so as to fill up this wasted portion: thus cavity 6 presents a toroidal combustion chamber configuration.

Also, in the case of the homogenious charge compression ignition combustion, it was found that suppressing air flow within combustion chamber 5 as far as possible lowers the combustion temperature and makes it possible to decrease NOx and furthermore makes it possible to improve fuel consumption by suppressing heat loss. Consequently, for cavity 6 in this embodiment, a shape is adopted that has no lip projecting inwards in the radial direction at the cavity inlet i.e. which is not of the so-called re-entrant type. Specifically, it is known that, in the case of a re-entrant type, in general the swirl-retaining capability within the cavity is high, thereby also conferring swirl on the air outside the cavity during the expansion stroke and promoting movement of air within the entire combustion chamber; this makes possible more vigorous combustion and so is desirable in the ordinary combustion mode. However, in the case of homogenious charge compression ignition combustion, premixed vapor is formed from the beginning, facilitating combustion, so, if combustion becomes too vigorous, the combustion temperature becomes elevated, increasing NOx. Also, to the extent that the combustion temperature is elevated, heat loss also increases, adversely affecting fuel consumption. Therefore, in this embodiment, in which homogenious charge compression ignition combustion is performed, a re-entrant type cavity is not adopted. For this reason, a low-swirl shape may also be adopted for the air intake port.

Various other embodiments of the present invention may also be adopted.

To summarize the above, with the present invention, the excellent benefits are exhibited that fuel injection is performed in a suitable manner in all regions of engine operation while also realizing homogenious charge compression ignition combustion and achieving cleaning of the exhaust gas and reduction of fuel costs.

What is claimed is:

1. A direct injection diesel engine comprising a combustion chamber defined by a cylinder, cylinder head and piston, a cavity formed as a recess in said piston defining and forming part of said combustion chamber, and a fuel-injection nozzle that injects fuel into said combustion chamber, in which there is provided a conventional injection mode in which fuel is injected from said fuel injection nozzle with a timing in the vicinity of the compression top dead center of said piston and a homogeneous charge compression injection mode in which fuel is injected from said fuel injection nozzle with a timing that is earlier then that in the conventional injection mode and such that fuel ignition does not occur at least until injection has been completed, fuel injection being performed by said conventional injection mode during full load operation of the engine and fuel injection being performed by said homogeneous charge compression injection mode during part load operation of the engine, wherein the injection angle of said fuel injection nozzle with respect to the nozzle axis is a fixed angle such that in said conventional injection mode fuel reaches the inside wall of the cavity on the outside in the radial direction from the lowermost position of said cavity and in said homogeneous charge compression injection mode fuel reaches at least the inside wall of the cavity.

2. The direct injection diesel engine according to claim 1, wherein a case in which the excess air ratio λ is less than 2.5 is identified as full load operation whereby fuel injection is performed in said conventional injection mode, and a case in which the excess air ratio λ is at least 2.5 is identified as part load operation whereby fuel injection is performed in said homogeneous charge compression injection mode.

3. The direct injection diesel engine according to claim 1 wherein said injection angle is equal to or less than 67.5°.

4. The direct injection diesel engine according to claim 1, wherein the timing of commencement of fuel injection in said homogeneous charge compression injection mode is subsequent to 50° before compression top dead center and prior to 20°.

5. The direct injection diesel engine according to claim 1, wherein a protrusion is formed in the middle of the bottom wall of said cavity, the sidewall of said cavity being constituted with a face such that throttling is not formed at the cavity inlet.

6. The direct injection diesel engine according to claim 2, wherein the injection angle of said fuel injection nozzle with respect to the nozzle axis is a fixed angle such that in said conventional injection mode fuel reaches the inside wall of the cavity on the outside in the radial direction from the lowermost position of said cavity and in said homogeneous charge compression injection mode fuel reaches at least the inside wall of the cavity.

7. The direct injection diesel engine according to claim 2, wherein the timing of commencement of fuel injection in said homogeneous charge compression injection mode is subsequent to 50° before compression top dead center and prior to 20°.

8. The direct injection diesel engine according to claim 1, wherein the timing of commencement of fuel injection in said homogeneous charge compression injection mode is subsequent to 50° before compression top dead center and prior to 20°.

9. The direct injection diesel engine according to claim 3, wherein the timing of commencement of fuel injection in said homogeneous charge compression injection mode is subsequent to 50° before compression top dead center and prior to 20°.

10. The direct injection diesel engine according to claim 2, wherein a protrusion is formed in the middle of the bottom wall of said cavity, the sidewall of said cavity being constituted with a face such that throttling is not formed at the cavity inlet.

11. The direct injection diesel engine according to claim 1, wherein a protrusion is formed in the middle of the bottom wall of said cavity, the sidewall of said cavity being constituted with a face such that throttling is not formed at the cavity inlet.

12. The direct injection diesel engine according to claim 3, wherein a protrusion is formed in the middle of the bottom wall of said cavity, the sidewall of said cavity being constituted with a face such that throttling is not formed at the cavity inlet.

13. The direct injection diesel engine according to claim 4, wherein a protrusion is formed in the middle of the bottom wall of said cavity, the sidewall of said cavity being constituted with a face such that throttling is not formed at the cavity inlet.

* * * * *